United States Patent [19]

Lama

[11] Patent Number: 4,462,662

[45] Date of Patent: Jul. 31, 1984

[54] IMAGING SYSTEM UTILIZING A GRADIENT INDEX LENS ARRAY COMPENSATED FOR NON-UNIFORM OBJECT ILLUMINATION

[75] Inventor: William L. Lama, Webster, N.Y.

[73] Assignee: Xerox Corporation, Stamford, Conn.

[21] Appl. No.: 274,020

[22] Filed: Jun. 15, 1981

[51] Int. Cl.³ .................... G02B 5/14; G03B 27/00
[52] U.S. Cl. ............................. 350/413; 350/96.27; 350/96.31; 355/1
[58] Field of Search ............... 350/96.27, 96.31, 413; 355/1

[56] References Cited

U.S. PATENT DOCUMENTS

| | | | |
|---|---|---|---|
| 3,658,407 | 4/1972 | Kitano et al. | 350/96 B |
| 3,922,062 | 11/1975 | Uchida | 350/96 WG |
| 3,947,106 | 3/1976 | Hamaguichi et al. | 355/1 |
| 3,981,575 | 9/1976 | Tanaka et al. | 355/1 |
| 4,084,895 | 4/1978 | Ogawa et al. | 355/1 |
| 4,193,679 | 3/1980 | Mochizuki et al. | 355/1 |
| 4,331,380 | 5/1982 | Rees et al. | 350/413 X |
| 4,373,780 | 2/1983 | Lama | 350/96.31 X |
| 4,382,672 | 5/1983 | Boykin | 355/1 |

FOREIGN PATENT DOCUMENTS 1489420 10/1977 United Kingdom.

OTHER PUBLICATIONS

"Fibres Optiques et Lentilles (Selfoc)"; *L'onde Electrique;* vol. 59, No. 2; Feb. 1979; pp. 26–27.

"Gradient-Index Optics: A Review" by Duncan T. Moore, Applied Optics, Apr. 1, 1980, vol. 19, No. 7, pp. 1035–1038.

"Some Radiometric Properties of Gradient-Index Fiber Lenses" by James D. Rees and William Lama, Applied Optics, Apr. 1, 1980, vol. 19, No. 7, pp. 1065–1069.

*Primary Examiner*—John K. Corbin
*Assistant Examiner*—Scott J. Sugarman

[57] ABSTRACT

A gradient index lens array used in an optical imaging system is modified so as to compensate for factors creating a non-uniform image exposure at an image plane. Various parameters of the individual fibers comprising the array, such as index gradient, radii and packing density, are selectively modified so as to obtain a desired exposure profile.

7 Claims, 7 Drawing Figures

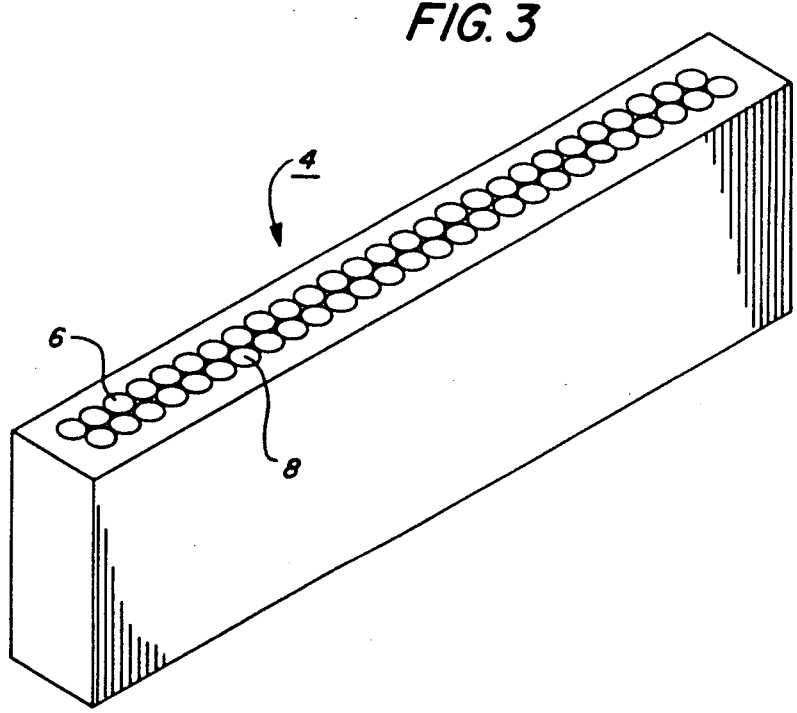

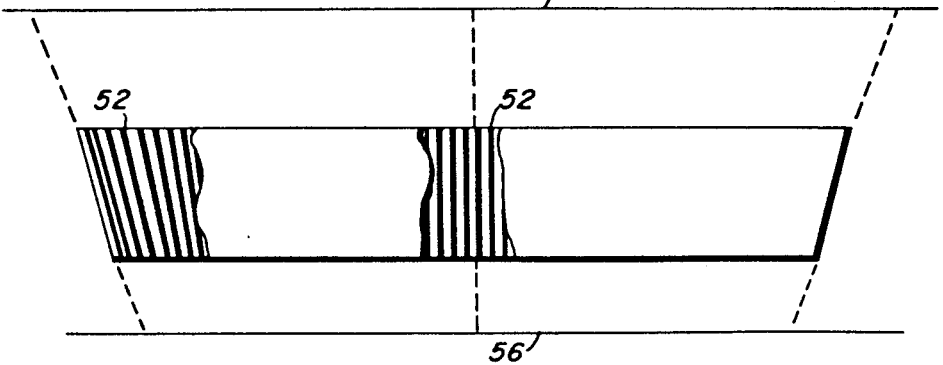

IMAGING SYSTEM UTILIZING A GRADIENT INDEX LENS ARRAY COMPENSATED FOR NON-UNIFORM OBJECT ILLUMINATION

BACKGROUND AND PRIOR ART STATEMENT

The present invention relates to an imaging system wherein an object in an object plane is illuminated by an elongated light source and the reflected image is transmitted to an imaging plane by a gradient index lens array. More particularly, it relates to a gradient index lens array modified so as to provide a spatially uniform exposure level at the image plane.

Image transmitters comprising bundled gradient index optical fibers are known in the art. U.S. Pat. No. 3,658,407 describes a light conducting fiber made of glass or synthetic resin which has a refractive index distribution in a cross section thereof that varies parabolically outward from a center portion thereof. Each fiber acts as a focusing lens to transmit part of an image of an object placed near one end. An assembly of fibers, in a staggered two-row array, transmit and focus an image of the object. The fiber lenses are produced under the trade name "SELFOC"; the mark is registered in Japan and owned by Nippon Sheet Glass Company, Ltd.

Numerous techniques are known in the art for manufacturing glass or plastic fibers with index-of-refraction variations. These are usefully summarized in an article entitled "Gradient Index Optics: A Review" by Duncan T. Moore. Applied Optics, Apr. 1, 1980, Volume 19, No. 7, pages 1035–1038. Relevant optical characteristics of gradient index lens arrays are described in an article entitled "Some Radiometric Properties of Gradient-Index Fiber Lenses", by James D. Rees and William Lama, Applied Optics, Apr. 1, 1980, Volume 19, No. 7, pages 1065–1069.

Gradient index lens arrays have found use in a number of technologies, e.g. in construction of printed type optical circuits as disclosed in U.S. Pat. No. 3,922,062 and as a replacement for conventional optical systems in copiers as disclosed in U.S. Pat. Nos. 3,947,106 and 4,193,679.

In copier applications such as those disclosed in the referenced patents, the light source which provides illumination of the document to be copied must be able to provide an illumination band which is quite narrow and intense relative to the illumination band required for copiers using conventional projection lenses. This requirement is necessitated by the inherent operational structure of the gradient index lens array. Another requirement, common to all copier optical systems, is that given a uniformly bright object, a uniform level of image exposure be provided at the image plane. A typical cause of non-uniform image plane exposure is the light fall-off at the ends of elongated tubular sources such as fluorescent lamps. This light fall-off produces a non-uniform illumination of the document scan line, the nonuniformity being transmitted through the lens array to create a corresponding non-uniform image exposure.

Various techniques have been devised to compensate for this non-uniformity. The light source may be modified to produce a uniform level of document illumination by using a longer tube so that only the central portion of the tube provides the useful illumination. This, however, is a relatively inefficient expedient which increases the size of the copier. Another technique, borrowed from conventional lens systems, is to introduce a light shaping component such as a variable density filter or a variable aperture slit in the optical path, generally just before the imaging plane. The slit is appropriately shaped to permit more illumination to pass through the ends than in the center, i.e. the well known "butterfly slit" while a filter is denser in the middle and increasingly transparent at the ends. However, because of the much narrower ray bundle which is projected by the gradient index array, these techniques are exceedingly difficult to implement with any degree of accuracy.

The present invention provides a novel and relatively simple way to achieve a uniform level of image plane exposure without requiring the use of specially designed lamps or additional light shaping components. The compensation for end fall-off is achieved by altering the nature of the gradient lens array in such a way that greater illumination is transmitted at the end portion than at the central portion. This alteration is achieved by varying any one of the lens parameters such as the fiber packing density, individual fiber radius or individual fiber index gradient. Given a particular illumination profile which has end non-uniformity characteristics, a lens array can be designed according to the invention whereby an exposure distribution that is spatially uniform can be achieved at the image plane.

FIG. 3 shows a top perspective view of a prior art double row gradient index lens array.

FIG. 4 shows a partial top view of a first embodiment of the present invention wherein the gradient index fiber spacing is selectively varied.

FIG. 5 shows a partial top view of a second embodiment of the present invention wherein the gradient index fiber radii (R) are selectively varied.

FIG. 6 shows a partial top view of a third embodiment of the present invention wherein the gradient index fibers' constant values (A) are selectively varied.

FIG. 7 is a schematic end view of a prior art reduction/enlargement gradient index array in an imaging system.

DESCRIPTION

Figure 1:
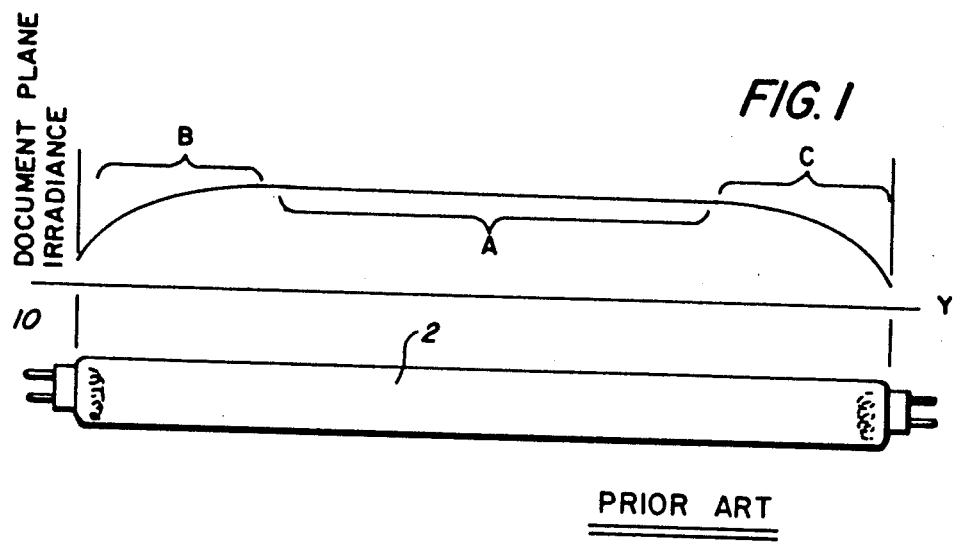
FIG. 1 shows a non-uniform irradiance profile produced by a fluorescent lamp at the object plane of FIG. 2.

Referring now to FIG. 1, there is shown, in schematic side view, a prior art optical imaging system 2 which includes a gradient index lens array 4 comprising two staggered rows 6, 8 of identical gradient index fibers arranged in a bundled configuration as is known in the prior art. FIG. 3 shows a top perspective view of array 4. Transparent object plane 10 in FIG. 1 is adapted for movement past lens 4 in the indicated direction. Plane 10 has an object 12, which may be a document, supported thereon. Fluorescent lamp 14 provides a narrow intense band of illumination through aperture 15 across the Y width of the object plane 10.

Figure 2:
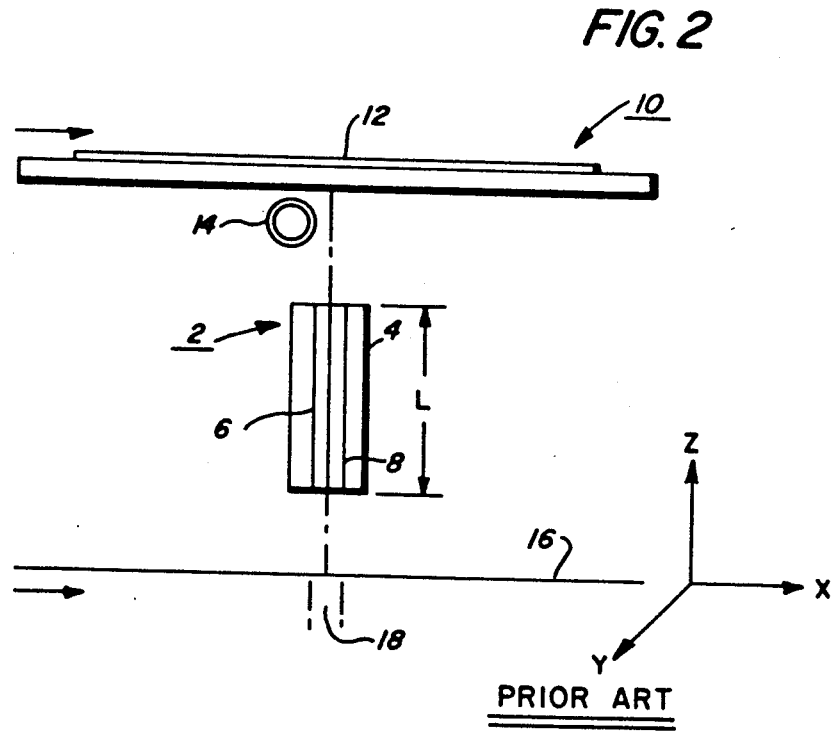
FIG. 2 is a schematic end view of a prior art gradient index array in a imaging system.

FIG. 2 shows a typical object plane irradiance profile for a fluorescent lamp. When energized, the lamp provides an object plane illumination output profile P at a plane 10 parallel to the axis of the lamp. The profile is fairly uniform over a central portion A but falls off over end portions B and C.

In operation and referring to FIG. 1, plane 10 is moved in the X direction across the illuminated area at a speed synchronous with that of a photosensitive imaging plane 16. A strip of light is reflected from object 12 and focused by lens 4 onto exposure strip 18 of plane 16. If the illumination profile at the object plane is not ompensated for, the exposure profile at the image plane will be subject to the same non-uniformity levels.

Turning now to the present invention, it was perceived by Applicant that the exposure spatial distribution of a gradient index lens array was dependent upon any one of three parameters. These are:

(1) The packing density of the individual fibers, i.e. how closely spaced are the fibers relative to each other;

(2) The radius of each individual fiber, and (3) The individual fiber index gradient constant, commonly designated as A.

It was further realized that these parameters could be varied, either separately, or in combination, to produce an exposure distribution level that is spatially uniform even if the document illumination were not. FIG. 3 shows the typical distribution of the prior art double row lens array. FIGS. 4–6 show the lens array modified to change fiber packing density, fiber radius and index gradient, respectively.

Turning first to FIG. 3, there is shown a top view of lens array 4. Each of the fibers comprising rows 6, 8 are identical to each other; i.e. have the same radius and index gradient. Furthermore, the fiber packing density is uniform from one end of the array to the other.

FIG. 4 illustrates a first modification of the lens array which compensates for the non-uniform object plane illumination condition. In this embodiment, lens array 24 comprises two rows 26, 28 of gradient index fibers. Only one half of the lens array is shown for ease of description. As seen, fibers in the center portion are more widely spaced relative to the more closely spaced fibers at the array end. In other words, the fiber spacing progressively decreases with approach to the ends. With this variable spacing more fibers contribute to the exposure of an image point near the ends of the array than the center and the inherent illumination falloff is compensated for by the increased number of contributing fibers. A tradeoff with this embodiment is some modest increase in exposure modulation at the center and some depth of focus variability.

FIG. 5 illustrates a second embodiment of the lens array wherein the fiber radii are selectively changed. Lens array 34 comprises two rows 36, 38 of gradient index fibers. The fibers have a radius equal to one of two selected values $R_1$ or $R_2$ with $R_2 > R_1$. As shown, more of the $R_1$ radius fibers are used near the center of the array, while a higher percentage of $R_2$ radius fibers are used near the end of the array. The number of $R_2$ fibers are seen to increase with increasing distance from the center. Since image plane exposure is proportional to the cube of the value of the fiber radius (see reference by Rees & Lama), the $R_2$ fibers at the ends will compensate for the geometric exposure falloff. Since the exposure of any point in the image plane is given by the sum of the contribution from several fibers, a reasonably uniform exposure profile may be achieved through the use of only two fiber radii although more than two fiber radii may be used. As for the variable spacing solution above, some exposure modulation and depth of focus variations are introduced.

For convenient handling and assembly, the $R_1$ fibers in rows 36, 38 have been made to have the same physical diameter as the $R_2$ fibers by surrounding the $R_1$ fibers with cladding 39. This permits the fibers to be seated in the conventional parallel grooved seating members used to assemble conventional two rows staggered lenses. The conventional close-packed arrangement may also be employed (see FIG. 3). If desired, however, the groove spacing on the seating member could be varied to provide uniform spacing between different radii fibers. Finally, it is possible to employ fibers all of the same radius $R_2$ and use a mask to limit the aperture of those fibers designated $R_1$.

FIG. 6 illustrates a third embodiment of the lens array wherein the fibers have one of two values of index gradient constant A. Lens array 44 comprises two rows 46, 48 of equal radius gradient index fibers. The fibers in each row have gradient index value of $A_1$ or $A_2$ with $A_2 > A_1$. Since exposure at the image plane is proportional to A (see reference by Rees and Lama), the distribution of $A_1$ and $A_2$ fibers is designed to compensate for exposure falloff by placing a plurality of $A_1$ fibers in the center area while the majority of $A_2$ fibers are used near the ends of the array.

Again, only two different values of A are needed since several fibers contribute to the exposure at any point. A disadvantage to this compensation technique is that the $A_1$ and $A_2$ fibers must have slightly different lengths to maintain constant total conjugate.

The above examples have been described with relation to an optical system which has an illumination source providing a non-uniform level of illumination. While the most common lighting source is a fluorescent lamp, other lamps such as sodium vapor lamps are subject to the same problem. And even special lamps which produce relatively uniform illumination along their length, such as segmented tungsten, are frequently used with a length less than the lens array length so that less reflected light enters the extreme ends of the array. The present invention is equally applicable to these systems. Furthermore, other illumination systems may be envisioned which provide even more non-uniform document illumination than the previous examples. For instance, a simple inexpensive illuminator may be constructed of a single miniature tungsten lamp positioned at the center of a cylindrical diffuse cavity with an axial aperture. This illuminator would provide highly non-uniform document illumination which could, however, be compensated for by the special gradient index lens arrays described herein.

Even for optical systems in which a uniform illumination source is provided, however, certain gradient index lens array applications are still subject to exposure non-uniformity problems due to a unique construction. Referring now to FIG. 7, there is shown a gradient index lens array 50 which is capable of transmitting reduced or enlarged images according to the principle disclosed in U.S. Pat. No. 4,331,380 assigned to the same assignee as the present invention. As shown in FIG. 7, fibers 52 are geometrically arranged in a fan-like array with the fibers near the array center being nearly vertical (perpendicular to object plane 54 and image plane 56) while the fibers near the end of the array are tilted from the vertical. With this configuration, it has been found that, even if an illumination source provides a uniform level of illuminatin at the object plane, the image exposure increases at the ends of the array, compared to exposure levels at the center. This increased end exposure is due to the combined effects of an increase in the effective size of the entrance and exit pupils of each fiber and the increased field of view which yields greater overlap of the irradiance profiles from neighboring fibers.

According to the principles of the present invention, lens array 50 can be appropriately modified to compensate for the exposure non-uniformity effects by selective alteration of the three parameters as discussed above. In this case, however, the arrangements would be opposite to the configuration shown in FIG. 4-6 since the desired effect would be to increase rather than decrease center exposure.

And, although the above described lens arrays in FIGS. 4-7 have been disclosed in terms of a double row of fibers, the principles are equally aplicable to a single row gradient index lens array. An exemplary array of this type of array is described in my U.S. Pat. No. 4,373,780.

In conclusion, it may be seen that there has been disclosed an improved optical imaging system. The exemplary embodiments described herein are presently preferred, however, it is contemplated that further variations and modifications within the purview of those skilled in the art can be made herein. The following claims are intended to cover all such variations and modifications as fall within the spirit and scope of the invention.

What is claimed is:

1. An optical imaging system including a plurality of gradient index optical fibers combined into at least a single row to form a linear lens array, said array positioned between an object plane and a photosensitive image plane and adapted so as to transmit, and image, light reflected from an object lying in the object plane onto the image plane said array characterized by being comprised of at least two groups of optical fibers, a first group having identical gradient index value A and fiber radius R parameters, and a second group having at least one parameter value which varies from the parameter value of said first group, the fibers of both groups being distributed throughout the array so as to transmit therethrough a uniform level of said reflected object that resulting in a uniform exposure level at said imaging plane.

2. The optical imaging system of claim 1 wherein said varying parameter in said second group is the gradient index value A and fibers having the smaller gradient index value are concentrated toward the center of the array while the proportion of fibers having the higher gradient index values progressively increase towards the ends of the array.

3. The optical imaging system of claim 1, said varying parameter in said second group is the fiber radius R and wherein fibers having smaller radii are concentrated towards the center while the proportion of fibers having larger radii progressively increase towards the ends of the array.

4. The optical imaging system of claim 3 whereby said smaller radii fibers have individual claddings which cause their total effective diameter to be equal to said larger radii fibers.

5. The optical imaging system of claim 1 whereby said lens array comprises a double row of gradient index fibers.

6. The optical imaging system of claim 2 wherein said lens array is a reduction/enlargement lens array wherein the fibers are arranged in a fan-like configuration and wherein said fibers having smaller gradient index values are concentrated towards ends of the array while the proportion of fibers having higher gradient index values progressively increase towards the center of the array.

7. The optical imaging system of claim 3 wherein said lens array is a reduction/enlargement lens array wherein the fibers are arranged in a fan-like configuration and wherein said fibers having smaller radii are concentrated towards the ends of the array while the proportion of higher radii fibers progressively increase towards the center of the array.

* * * * *